United States Patent [19]

Osaka

[11] 4,308,556
[45] Dec. 29, 1981

[54] TELEVISION VIDEO SIGNAL SCRAMBLING SYSTEM

[75] Inventor: Hiroshi Osaka, Kodaira, Japan

[73] Assignee: Clarion Co., Ltd., Tokyo, Japan

[21] Appl. No.: 128,152

[22] Filed: Mar. 7, 1980

[30] Foreign Application Priority Data

Mar. 12, 1979 [JP] Japan .................................. 54/28533

[51] Int. Cl.$^3$ ............................................. H04N 7/16
[52] U.S. Cl. ...................................... 358/124; 358/114
[58] Field of Search ................................ 358/124, 114

[56] References Cited

U.S. PATENT DOCUMENTS 4,022,972  5/1977  Pires ..................................... 358/124

Primary Examiner—S. C. Buczinski
Attorney, Agent, or Firm—Oblon, Fisher, Spivak, McClelland & Maier

[57] ABSTRACT

A video signal scrambling system for use with a pay television system in which video signals are scrambled so that only specified subscribers can receive the program. Inversion of the video signal level for scrambling is performed only when the average gradation of the video signals varies relatively largely so that flickering is eliminated from the reproduced picture.

2 Claims, 4 Drawing Figures

TELEVISION VIDEO SIGNAL SCRAMBLING SYSTEM

BACKGROUND OF THE INVENTION

The present invention relates to a television video signal scrambling system and, more particularly, to a video signal scrambling system for use in a wireless pay television broadcasting system in which a broadcasting station transmits television signals scrambled by inverting video signals by an encoder for providing sustaining programs at charge so that only specified subscribers reproduce the television signals on their television receivers by decoding the scrambled signals with their decoders.

The charged wireless television system generally referred to as a pay television system was developed in reply to a demand for more substantial and enriched programs even with charge in view of dull commercial messages indispensable to charge-free commercial broadcasting programs and deterioration in the quality of the programs due to various restrictions. The future of the pay television system is noteworthy because it has significant advantages such that cost and time for laying cable can be saved and that a system can theoretically accomodate a limitless number of subscribers because it is a wireless system.

In a wireless pay television system intended for specified subscribers only, television signals and audio signals are generally scrambled for foreclosing non-subscibers from receiving the program. A conventional video signal scrambling system is shown in FIG. 1, in which a video signal applied to an input terminal 1 is inverted in its polarity by a video signal polarity inverter 3 and applied thereby to an output terminal 2. The video polarity inverter 3 is controlled by a random number signal generator 4, that is, the video polarity inverter 3 provides the video signal with its polarity inverted or uninverted corresponding to a randomly changing logic value signal from the random number signal generator 4. A decoder can decode and restore the scrambled video signals according to the prearranged key code signal. Thus, the conventional wireless pay television system is so arranged that only the specified subscribers having the decoders, respectively, can satisfactorily receive the programs.

The conventional video signal scrambling system has a disadvantage that, when a subscriber restores with his decoder video signals transmitted by the broadcasting station in a form inverted by the encoder, if there is a lag between the original video signals and the restored video signals caused by the difference in characteristics (for example, linearity) between the component parts (such as diodes, transistors and the like) used in the encoder and in the decoder, flickering is caused in the picture due to the irregular brightness and the variation in the hue and the like. In order to avoid this disadvantage, it is necessary to equalize the characteristics of the component parts of the encoder and the decoders and to regulate and maintain them strictly. This, however, is not preferable in view of the difficulties in manufacture and economy.

SUMMARY OF THE INVENTION

Accordingly, an object of the present invention is to provide a video signal scrambling system capable of obviating the disadvantage of flickering in the picture without increasing the cost.

According to the present invention, effect of the flickering on the visual sensation is reduced by performing the video signal polarity inversion, which was heretofore performed at random independently of the quality of the picture, only when the average gradation of the video signals changes.

The invention will be better understood from the following description taken in connection with the accompanying drawings.

DETAILED DESCRIPTION OF THE PREFERRED EMBODIMENT

Figure 1:
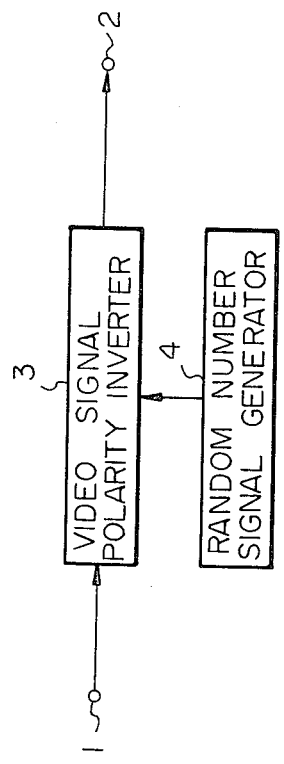
FIG. 1 is a block diagram of a conventional video image scarambling system.
Figure 2:
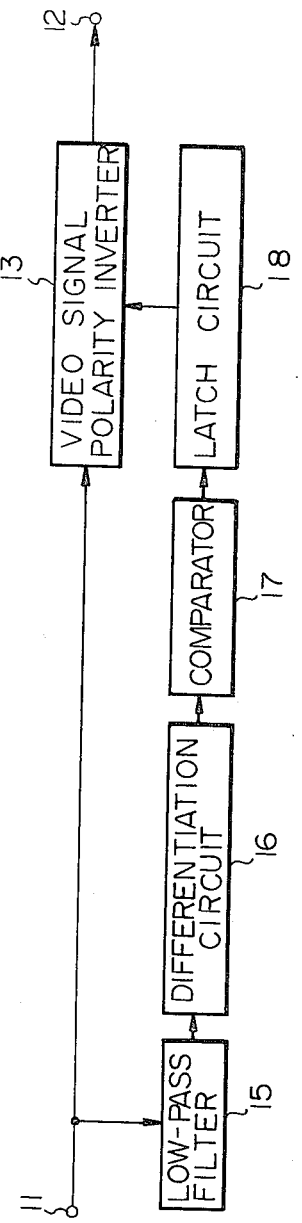
FIG. 2 is a block diagram of an embodiment of the video image scrambling system according to the present invention.

An embodiment of the present invention will now be described in detail with reference to the accompanying drawings, in which FIG. 2 is a block diagram of the preferred embodiment of the present invention. The video signal scrambling system shown in FIG. 2 comprises a low-pass filter 15, a differentiation circuit 16, a comparator 17, a latch circuit 18, and a video signal polarity inverter 13.

A video signal applied to an input terminal 11 is cut off in the higher band by the low-pass filter 15 so that a signal proportional to the average gradation of the video signals occurs in the output of the low-pass filer 15. The differentiation circuit 16 generates a differentiation pulse when the average gradation of the video signals changes. The comparator 17 is preferably of a window type and provides a signal to the latch circuit 18 only when a positive or negative pulse having the absolute value exceeding the predetermined value is applied from the differentiation circuit 16, to invert the state of the latch circuit 18 at each output of the signal thereto. The video signal applied to the input terminal 11 is applied thereby to the low-pass filter 15 and also to the polarity inverter 13 which inverts or uninverts the polarity of the video signal in accordance with the control signal from the latch signal 18. In other words, the polarity inverter 13 alternately inverts and uninverts the video signals in polarity and transmits them to an output terminal 12.

Figure 3:
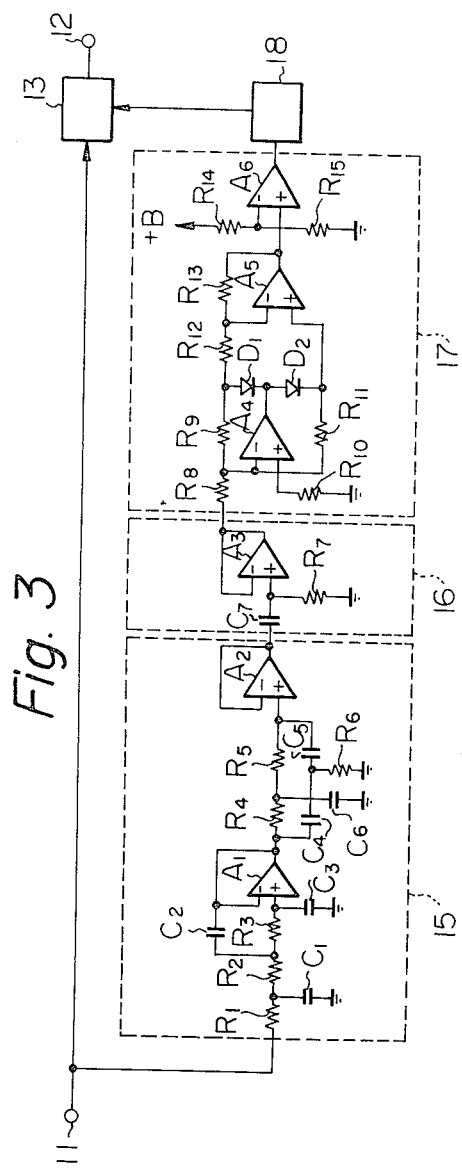
FIG. 3 is a circuit diagram of the embodiment of the present invention.

As shown in the circuit diagram of FIG. 3, the low-pass filter 15 comprises a low-pass active filter consisting of resistors R1, R2 and R3, capacitors C1, C2 and C3, and an OP amplifier A1, and a twin-T band-elimination filter consisting of resistors R4, R5 and R6, capacitors C4, C5 and C6, and an OP amplifier A2. The low-pass active filter has the cut-off frequency determined at approximately 30 $H_Z$. For the purpose of thoroughly removing the effect by the 60$H_Z$ component of the vertical synchronizing signal, the twin-T band-elimination filter is provided to eliminate the band around the 60$H_Z$ component. Accordingly, the output of the low-pass filter 15 changes in proportion to the average gradation of the video signals. That is, the output of the filter 15 presents a large change when the picture changes from a scene to another and shows no radical change when there is no substantial change in the content of the picture.

The differentiation circuit 16 comprises a capacitor C7, a resistor R7, and an OP amplifier A3 and provides a signal corresponding to the rate of change in the level of the signal from the low-pass filter 15. Accordingly, the signal output from the differentiation circuit 16 is in a high level when the gradation of the video signal applied to the input terminal 11 changes radically in steps. The comparator 17 comprises a rectifier circuit and a comparison circuit. The rectifier circuit consists of resistors R8, R9, R10, R11, R12 and R13, diodes D1 and D2, and OP amplifiers A4 and A5. The comparison circuit consists of resistors R14 and R15 and an OP amplifier A6. The rectifier circuit rectifies and amplifies the signal from the differentiation circuit 16 into the absolute value level. The comparison circuit compares the absolute value level with the reference level determined by an electric power source +B and the resistors R14 and R15, and, when the level from the rectifier circuit exceeds the reference level, applies a signal to the latch circuit 18 to invert the output thereof. Accordingly, the comparator 17 functions to respond to either change of the picture from bright to dark or from dark to bright.

The latch circuit 18, each time it receives a signal from the comparator 17, applies alternately an energizing signal and a deenergizing signal to the control input of the video polarity inverter 13. That is, assuming that the latch circuit 18, which has received signals from the comparator 17 and applied an energizing signal to the control input of the polarity inverter 13 so as to invert the polarity of the signal applied to the input terminal 11 and to transmit it to the output terminal 12, receives the next signal from the comparator 17, the latch circuit 18 applies this time a deenergizing signal to the control input so as to transmit the video signal provided to the input terminal 11 to the output terminal 12 with the uninverted polarity.

Figure 4:
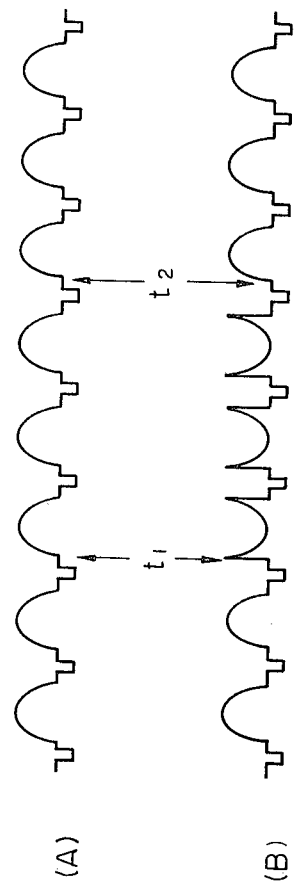
FIG. 4 is a wave form diagram of an example of invertion of video signal, according to the present invention.

FIG. 4A shows a wave form of an example of uninverted video signals and FIG. 4B shows a wave form of an example of video signals scrambled by the video signal polarity inverter 13. It must be noted, however, that FIG. 4 does not faithfully represents the level of the video signals. As shown in FIG. 4, the video signals A are first applied to the input terminal 11. The polarity inverter 13 transmits the video signals at first without inverting the polarity thereof corresponding to the deenergizing signal from the latch circuit 18. At a point t1, when the picture changes to thereby change the average gradation of the video signals, the output of the low-pass filter 15 changes in response to the change in the average gradation. If the absolute value of the differentiation pulse generated by the differentiation circuit 16 upon the change in the output of the low-pass filter 15 exceeds the reference level determined at the comparison circuit of the comparator 17, the latch circuit 18 applies an energizing signal to the control input of the polarity inverter 13 to indicate that the video signal is inverted in polarity. Further, at a point t2, a similar change in the picture takes place, and the low-pass filter 15, the differentiation circuit 16 and the comparator 17 act as described above and, the latch circuit 18 applies this time a deenergizing signal to the polarity inverter 13 to stop the heretofore continued inverting action so as to indicate that the same video signal as that applied to the input signal is applied to the output signal.

As evident from the foregoing explanation, according to the present invention, the scrambling is performed by inverting the polarity of the video signal only when the picture changes to therby change the brightness of the frame, that is when the average gradation of the video signals changes. Therefore, the present invention has the advantage that the flickering is not perceived by the viewer even when a difference between the original signals and the reproduced signals is caused by the difference in characteristics between the encoder and the decoder. Accordingly, the present invention provides an economical video signal scrambling system in which there is no need to equalize the characteristics of the component parts used in the encoder and the decoders and the adjustment and maintenance of the encoder and the decoders is easy.

While we have shown and described a specific embodiment of our invention, it will be understood that this embodiment is merely for the purpose of illustration and description and that various other forms may be devised within the scope of our invention, as defined in the appended claims.

I claim:

1. A video signal scrambling system for use with a television broadcasting system in which a broadcasting station inverts at least a portion of the video signals with an encoder and transmits the signals while only specified subscribers restore the received video signals through decoders to receive a television program, said scrambling system being characterized by the provision of an apparatus for detecting change in average gradation of said video signals, the output of said detecting apparatus controlling the action for scrambling said video signals.

2. A video signal scrambling system as set forth in claim 1, characterized in that said detecting apparatus comprises a low-pass filter, a differentiation circuit, and a comparator, said differentiation circuit applying a signal corresponding to the rate of change in output of said low-pass filter to said comparator, and said comparator comparing the output of said differentiation circuit with a predetermined reference signal and providing an output when the signal from said differentiation circuit exceeds said reference signal.

* * * * *